United States Patent
Xiao et al.

(10) Patent No.: US 8,688,974 B2
(45) Date of Patent: Apr. 1, 2014

(54) METHOD FOR MANAGING WIRELESS MULTI-HOP NETWORK KEY

(75) Inventors: Yuelei Xiao, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 281 days.

(21) Appl. No.: 12/864,317

(22) PCT Filed: Jan. 21, 2009

(86) PCT No.: PCT/CN2009/070255
§ 371 (c)(1),
(2), (4) Date: Jul. 23, 2010

(87) PCT Pub. No.: WO2009/094938
PCT Pub. Date: Aug. 6, 2009

(65) Prior Publication Data
US 2010/0299519 A1    Nov. 25, 2010

(30) Foreign Application Priority Data
Jan. 23, 2008 (CN) .......................... 2008 1 0017387

(51) Int. Cl.
*H04L 29/06* (2006.01)

(52) U.S. Cl.
USPC ............................................. 713/155; 726/7

(58) Field of Classification Search
USPC .............. 380/28, 278, 279, 44; 713/171, 155
See application file for complete search history.

(56) References Cited

U.S. PATENT DOCUMENTS

| 7,194,622 | B1 | 3/2007 | Halasz et al. |
| 7,499,547 | B2 * | 3/2009 | Zheng et al. .................. 380/247 |
| 2001/0034834 | A1 * | 10/2001 | Matsuyama et al. .......... 713/156 |
| 2003/0211842 | A1 * | 11/2003 | Kempf et al. ................. 455/411 |

(Continued)

FOREIGN PATENT DOCUMENTS

| CN | 1564509 A | 1/2005 |
| CN | 1602109 A | 3/2005 |

(Continued)

OTHER PUBLICATIONS

Katarina Stanoevska-Slabeva; Impact of Mobile AD HOC Networks on the Mobile Value System; Date:Year: 2003; Citeseer;pp. 1-16.*

(Continued)

*Primary Examiner* — Mohammad W Reza
*Assistant Examiner* — Monjour Rahim
(74) *Attorney, Agent, or Firm* — Harness, Dickey & Pierce, P.L.C.

(57) ABSTRACT

A method for managing wireless multi-hop network key is applicable to a security application protocol when a WAPI frame method (TePA, an access control method based on the ternary peer-to-peer identification) is applied in a concrete network containing a Wireless Local Area Network, a Wireless Metropolitan Area Network AN and a Wireless Personal Area Network. The key management method of the present invention includes the steps of key generation, key distribution, key storage, key modification and key revocation. The present invention solves the technical problems that the prior pre-share-key based key management method is not suitable for larger networks and the PKI-based key management method is not suitable for wireless multi-hop networks; the public-key system and the ternary structure are adopted, thereby the security and the performance of the wireless multi-hop networks are improved.

9 Claims, 3 Drawing Sheets

(56) References Cited

U.S. PATENT DOCUMENTS

| | | | |
|---|---|---|---|
| 2006/0023887 A1* | 2/2006 | Agrawal et al. | 380/277 |
| 2008/0065888 A1* | 3/2008 | Zheng et al. | 713/171 |
| 2010/0290622 A1* | 11/2010 | Garcia Morchon et al. | 380/273 |
| 2011/0188653 A1* | 8/2011 | Yao et al. | 380/255 |

FOREIGN PATENT DOCUMENTS

| | | |
|---|---|---|
| CN | 1633071 A | 6/2005 |
| CN | 1655498 A | 8/2005 |
| CN | 1921384 A | 2/2007 |
| CN | 101039182 A | 9/2007 |
| CN | 101056177 A | 10/2007 |
| CN | 101068143 A | 11/2007 |
| CN | 101222325 A | 7/2008 |
| CN | 101222772 A | 7/2008 |
| JP | 2007208410 A | 8/2007 |
| KR | 20070048431 A | 5/2007 |
| WO | WO-00/38392 A2 | 6/2000 |

OTHER PUBLICATIONS

Korean Notice of Allowance regarding Application No. 10-2010-7018359, dated Jun. 28, 2012. Translation provided by Unitalen Attorneys at Law.

* cited by examiner

METHOD FOR MANAGING WIRELESS MULTI-HOP NETWORK KEY

This application claims the priority to Chinese Patent Application No. 200810017387.6, filed with the Chinese Patent Office on Jan. 23, 2008 and titled "ID-based Key Management Method for Wireless Multi-hop Network", which is herein incorporated by reference in its entirety.

FIELD OF THE INVENTION

The present invention relates to the field of network information security, and in particular to a key management method for a wireless multi-hop network.

BACKGROUND OF THE INVENTION

With the development of computer network and global mobile communications technologies, portable digital processing terminal devices have become a necessity in people's life and work, including laptops, Personal Digital Assistants (PDAs), computer peripherals, mobile telephones, pagers, household electronics, etc. They have strong processing capabilities and large storages, thereby forming a Personal Operating Space (POS). However, information exchange between these terminal devices mainly relies on cable connections, which is inconvenient to use. Thus, a wireless technology connecting the terminal devices in the POS and realizing movable and automated interconnection between the terminal devices, i.e., the wireless multi-hop network technology, is needed. In a wireless multi-hop network, communication data between non-neighboring terminal devices has to be transmitted with multi-hop routing.

There are four types of devices in a wireless multi-hop network: a terminal device, a routing coordinator, a network coordinator and a trusted center. The terminal device may communicate with other devices in the network, but can not transfer data for other devices in the network, i.e., the terminal device does not have routing function. Besides the functions of the terminal device, the routing coordinator is also responsible for transferring data for other devices in the network, i.e., the routing coordinator has the routing function. The network coordinator is responsible for transmitting network beacons, establishing a network, managing network nodes, storing network node information, searching for routing messages between a pair of nodes, and continually receiving information, and is also capable of transferring data for other devices in the network, i.e., the network coordinator has the routing function. Collectively, the network coordinator and routing coordinator may be referred to as coordinators. The trusted center is a key management center of the network, responsible for configuring key information for all the devices in the network. The network coordinator may function as the trusted center, or may designate other devices in the network as the trusted center. The wireless multi-hop network supports two types of network topologies: star topology, and point-to-point topology; and the point-to-point topology may further include mesh topology, and cluster topology, as shown in FIGS. 1 to 3.

For wireless multi-hop networks, existing key management methods normally include a pre-shared key-based key management method and a PKI-based key management method.

The first key management method is generally not suitable for large-scale networks, because it would be inconvenient to manage the pre-shared keys. The second key management method is not suitable for wireless multi-hop networks, because certificate management and the amount of communication are large.

SUMMARY OF THE INVENTION

The invention provides a key management method for a wireless multi-hop network, which generates a public key and a private key based on an ID of each device, to perform cryptographic authentication of devices in the wireless multi-hop network, thereby improving security and performance of the wireless multi-hop network, and solving the technical problem that the existing pre-shared key-based key management method is not suitable for large-scale networks and the existing PKI-based key management method is not suitable for wireless multi-hop networks.

An embodiment of the invention provides a key management method for a wireless multi-hop network, including:
a key generating step:
  building, by a trusted center, an ID-based public key according to an identity of a device to be registered; and
  generating, by the trusted center, an ID-based private key of the device by using the public key and a master key;
a key distributing step:
  submitting, by the device, the identity of the device to the trusted center of the wireless multi-hop network; and
  obtaining, by the device, an ID-based public-private key pair from the trusted center of the wireless multi-hop network in a secured manner; and
a key storing step:
  storing the master key for generating the ID-based private key of the device, and an ID-based public-private key pair; and
  storing the ID-based public-private key pair of the device.

To sum up, the key management scheme provided by the invention uses an ID-based public key mechanism, in which each device may communicate in the wireless multi-hop network in a secured manner using a public key and a private key based on its own ID, thereby improving security and performance of the wireless multi-hop network. The ID-based public key is revocable and is short in length, thus the number of enquiries for the validity of the public key can be reduced, thereby reducing transmission load and improving performance of the wireless multi-hop network. Moreover, a tri-element structure similar to that described in the Chinese wireless LAN specification is employed, and during authentication the device and the coordinator both can obtain the validity of their ID-based public keys according to a public key revocation table of the trusted center, thereby improving access security to the wireless multi-hop network; and the ID-based public-private key pair enables non-interactive key negotiation, thereby improving performance of the wireless multi-hop network.

In the accompanying drawings,

'●' denotes a coordinator, '○' for a terminal device, '↔' for a communication channel;

A is a terminal device requesting for authentication and access, B is a coordinator that A associates with, and S is a trusted center of the wireless multi-hop network.

DETAILED DESCRIPTION OF THE INVENTION

The technical solution provided by the invention is applicable to security application protocols when implementing the WAPI framework (an access control method based on TePA, Tri-element Peer Authentication) with a particular network including wireless LAN, wireless MAN (Metropolitan Area Network).

Wireless multi-hop networks includes low rate wireless Personal Area Networks, high rate wireless Personal Area Networks, wireless sensor networks, etc. The key management method may be used in these networks.

The wireless multi-hop network key management provided by the invention mainly includes ID-based key generating, distributing, storing, replacing and revoking.

Figure 1:
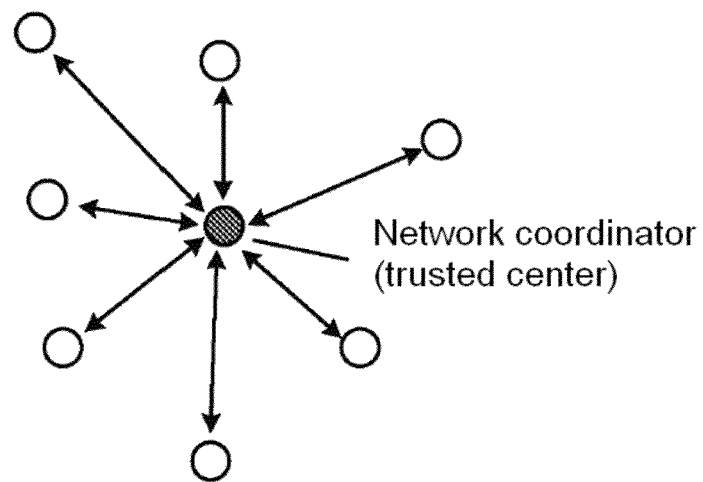
FIG. 1 illustrates an existing wireless multi-hop network of a star topology.
Figure 2:
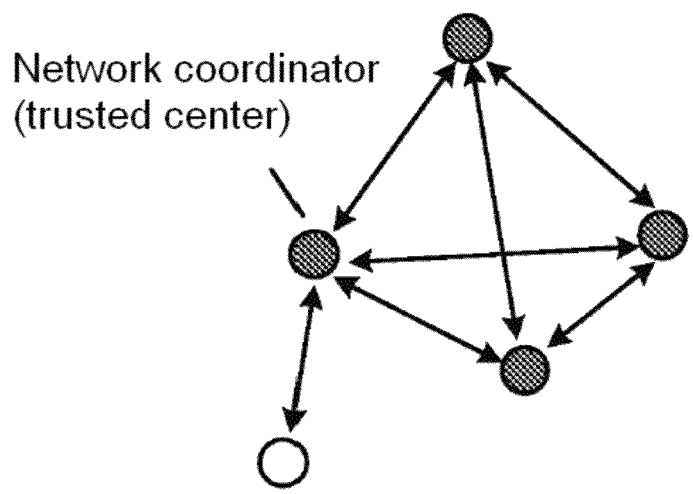
FIG. 2 illustrates a network of a mesh topology.
Figure 3:
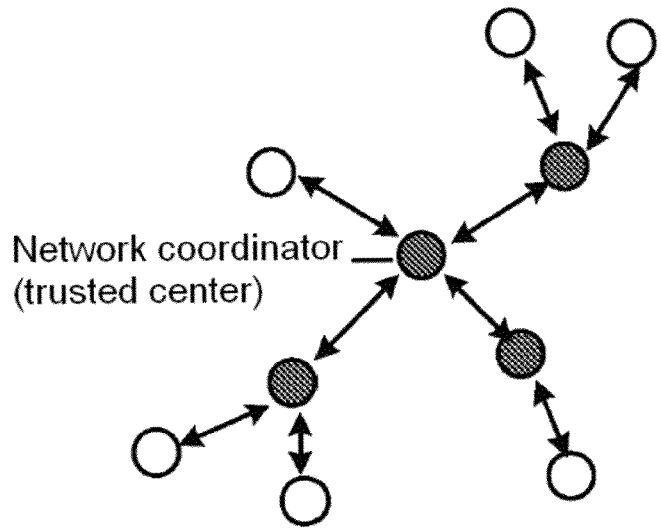
FIG. 3 illustrates a network of a cluster topology.
Figure 4:
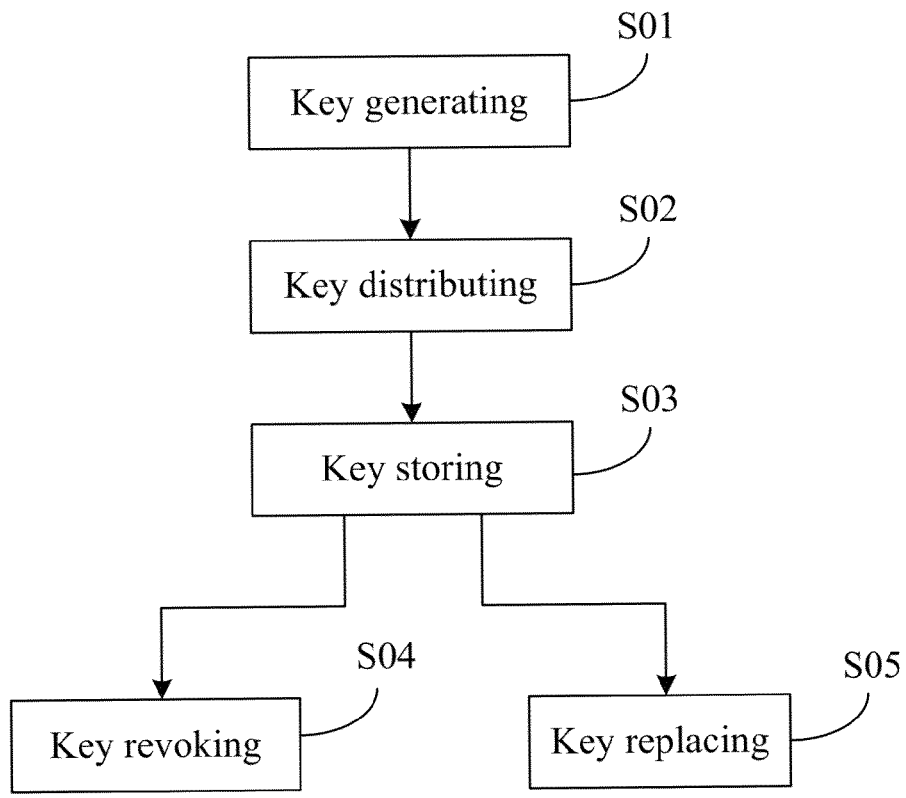
FIG. 4 is a flow chart of a key management method for a wireless multi-hop network according to an embodiment of the invention.

Now refer to FIG. 4. An ID-based key management method for a wireless multi-hop network is described below:

S01, key generating:

In an ID-based cryptographic scheme, an ID-based private key is the scalar multiplication of a master key and an ID-based public key, therefore the safety of the master key is important. The master key may be shared by multiple trusted centers, i.e., each trusted center possesses a part of the master key, known as a partial master key. Similarly, each part of a public key may be referred to as a partial public key, and each part of a private key may be referred to as a partial private key.

In the case where the master key for generating the ID-based private key of the device to be registered in the embodiment of the invention is shared by a group of upper-layer trusted centers, the trusted center in the wireless multi-hop network first builds an ID-based public key of the device to be registered according to an identity of the device; then submits the ID-based public key of the device to k trusted centers of the group of upper-layer trusted centers by a threshold cryptosystem; next, the k trusted centers use their partial master keys to generate partial ID-based private keys of the device, and transmit them to the trusted center of the wireless multi-hop network; finally, the trusted center obtains an ID-based private key of the device by synthesizing the partial ID-based private keys of the device.

Figure 5:
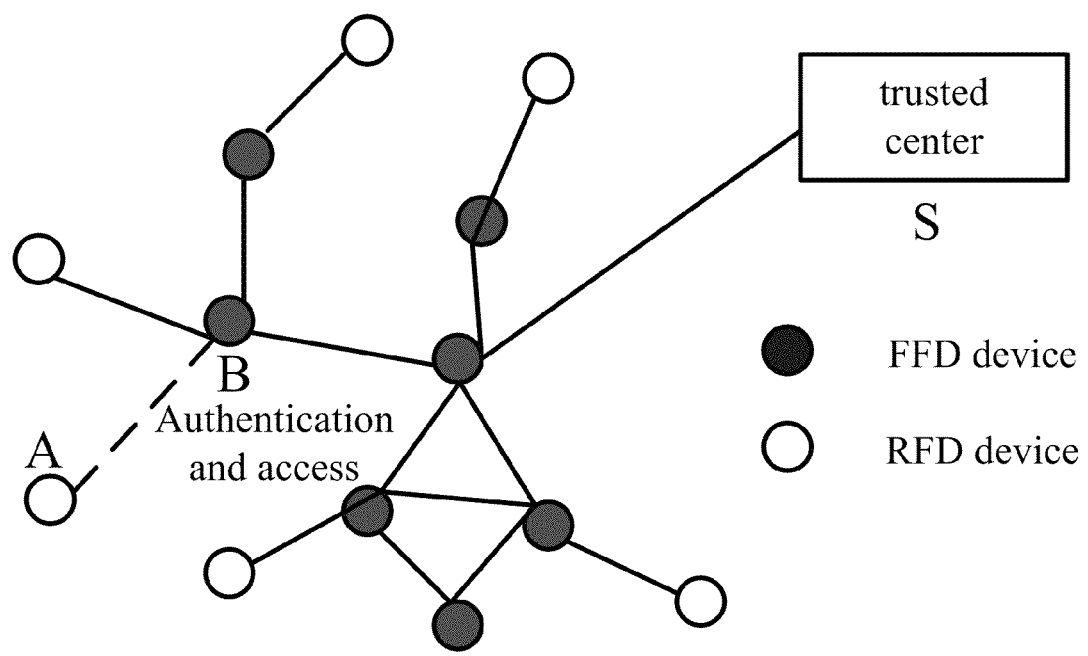
FIG. 5 is a structural diagram of an authentication and access system for a wireless multi-hop network according to an embodiment of the invention.

In an embodiment, in the system as shown in FIG. 5, in the case where the master key for generating the ID-based private key of the device is stored in the trusted center of the wireless multi-hop network, the trusted center in the wireless multi-hop network builds an ID-based public key of the device to be registered according to the identity of the device, and then generates an ID-based private key of the device by using the locally-stored master key.

The ID-based public key of the device may be a concatenated value of a CA certificate identity of the trusted center in the wireless multi-hop network, an identifier of the wireless multi-hop network, the identity of the device and the time limit of the public key.

Key generating includes the following steps:

Step 11, the trusted center in the wireless multi-hop network builds an ID-based public key according to the identity of the device. For example, the ID-based public key of the device may be a concatenated value of the identity of the device and the time limit of the public key.

Step 12, the trusted center in the wireless multi-hop network generates an ID-based private key of the device.

S02, key distributing:

After submitting the identity of the device to the trusted center of the wireless multi-hop network, the device obtains an ID-based public-private key pair of the device from the trusted center. Particularly, the ID-based private key is transmitted to the device in a cryptographic manner, to ensure the safety of the private key.

Key distributing includes the following steps:

Step 21, the device submits its own identity, e.g., device ID, to the trusted center of the wireless multi-hop network;

Step 22, the device obtains the ID-based public-private key pair from the trusted center of the wireless multi-hop network in a secured manner.

S03, key storing:

In the case where the master key for generating the ID-based private key of the device is shared by a group of upper-layer trusted centers, the master key is divided into n parts by a polynomial function, and the n parts are stored are n trusted centers of the group of upper-layer trusted centers. Each trusted center stores a part of the master key.

Alternatively, the master key for generating the ID-based private key of the device may also be stored at the trusted center of the wireless multi-hop network.

After distributing the ID-based public-private key pair of the device, the trusted center of the wireless multi-hop network deletes the ID-based public-private key pair of the device, and only stores an ID-based public-private key pair of its own. The device stores the ID-based public-private key pair of the device obtained from the trusted center of the wireless multi-hop network. Particularly, the ID-based private key has to be securely stored.

Key storing includes the following steps:

Step 31, the master key for generating the ID-based private key of the device is obtained and stored;

Step 32, the ID-based public-private key pair of the device is stored.

S04, key revoking:

For the convenience of public key management, a public key revocation table is maintained at the trusted center of the wireless multi-hop network, to record revoked public keys, so that the device can inquire about whether an ID-based public key is revoked.

If the ID-based private key of the device is leaked, the device requests to the trusted center of the wireless multi-hop network for revoking the ID-based public key of the device in an off-line manner. And on reception of the request, the trusted center adds the ID-based public key of the device to the public key revocation table;

If the ID-based private key of the device is no longer used, the device requests to the trusted center in the wireless multi-hop network for revoking the ID-based public key of the device by using a secured operation with a session key between the device and the trusted center. On reception of the request, the trusted center adds the ID-based public key of the device to the public key revocation table.

S05, key replacing:

If the ID-based public-private key pair of the device needs to be replaced, the device requests to the trusted center in the wireless multi-hop network for replacing the ID-based public-private key pair of the device by using a session key between the device and the trusted center. On reception of the request, the trusted center rebuilds an ID-based public key of the device; then obtains from the group of upper-layer trusted centers (or generates locally) an ID-based private key of the device corresponding the ID-based public key of the device; finally, the trusted center uses a session key between the device and the trusted center to transmit the re-generated ID-based public-private key pair of the device, and adds the original ID-based public key of the device to the public key revocation table.

To sum up, the key management scheme provided by the invention uses an ID-based public key mechanism, in which each device may communicate in the wireless multi-hop network in a secured manner using a public key and a private key based on its own ID, thereby improving security and performance of the wireless multi-hop network. The ID-based public key is revocable and is short in length, thus the number of enquiries for the validity of the public key can be reduced, thereby reducing transmission load and improving performance of the wireless multi-hop network. Moreover, a tri-element structure similar to that described in the Chinese wireless LAN specification is employed, and during authentication the device and the coordinator both can obtain the validity of their ID-based public keys according to a public key revocation table of the trusted center, thereby improving access security to the wireless multi-hop network; and the ID-based public-private key pair enables non-interactive key negotiation, thereby improving performance of the wireless multi-hop network.

By the preferable embodiments above, the object, technical solution and advantages of the invention are described in details. It should be appreciated that the embodiments described above are only preferable embodiments of the invention, and should not limit the scope of the invention. Any alterations, equivalents, or modifications without departing from the spirit and principle of the invention shall be included in the scope of the invention.

The invention claimed is:

1. A key management method for a wireless multi-hop network, comprising:
   storing, by a trusted center of the wireless multi-hop network, a master key for generating an ID-based private key of a device to be registered;
   submitting, by the device, an identity of the device to the trusted center;
   building, by the trusted center, an ID-based public key according to the identity of the device;
   generating, by the trusted center, the ID-based private key of the device by using the ID-based public key and the master key;
   storing, by the trusted center, the ID-based public-private key pair of the device;
   obtaining, by the device, the ID-based public-private key pair of the device from the trusted center;
   storing, by the device, the ID-based public-private key pair of the device;
   receiving, by the trusted center, a revocation request sent by the device to the trusted center of the wireless multi-hop network; and
   adding the ID-based public key of the device to a public key revocation table;
   wherein if the master key for generating the ID-based private key of the device is shared by at least two upper-layer trusted centers, the method comprises:
   submitting, by the trusted center of the wireless multi-hop network, the ID-based public key of the device to the at least two upper-layer trusted centers, to obtain partial private keys of the ID-based private key of the device; and
   building the ID-based private key of the device by using the obtained partial ID-based private keys of the device.

2. The key management method according to claim 1, further comprising:
   after distributing of the ID-based public-private key pair of the device, the trusted center of the wireless multi-hop network deleting the ID-based public-private key pair of the device and storing an ID-based public-private key pair of the trusted center of the wireless multi-hop network; and
   storing the ID-based public-private key pair obtained from the trusted center of the wireless multi-hop network at the device.

3. The key management method according to claim 1, further comprising:
   requesting, by the device, to the trusted center in the wireless multi-hop network for replacing the ID-based public-private key pair of the device by using a secured operation with a session key between the device and the trusted center, if the ID-based public key of the device is to be replaced;
   building, by the trusted center, a new ID-based public key of the device on reception of the request sent by the device;
   generating, by the trusted center, a new ID-based private key of the device by using the new ID-based public key of the device, to obtain a new ID-based public-private key pair of the device; and
   transmitting, by the trusted center, the new ID-based public-private key pair of the device by using a secured operation with a session key between the device and the trusted center, and adding the original ID-based public key of the device to a public key revocation table.

4. The key management method according to claim 1, further comprising:
   requesting, by the device, to the trusted center of the wireless multi-hop network for revoking the ID-based public key of the device in an off-line manner, if the ID-based private key of the device is leaked; and
   requesting, by the device, to the trusted center of the wireless multi-hop network for revoking the ID-based public key of the device, if the ID-based private key of the device is no longer used.

5. The key management method according to claim 1, further comprising:
   requesting, by the device, to the trusted center of the wireless multi-hop network for revoking the ID-based public key of the device, if the ID-based public key of the device is to be revoked; and
   adding, by the trusted center, the ID-based public key of the device to a public key revocation table, on reception of the request sent by the device.

6. The key management method according to claim 5, wherein,
   if the ID-based private key of the device is leaked, the device requests to the trusted center of the wireless multi-hop network for revoking the ID-based public key of the device in an off-line manner.

7. The key management method according to claim 5, wherein if the ID-based private key of the device is not leaked but is no longer used, the device requests to the trusted center of the wireless multi-hop network for revoking the ID-based public key of the device by using a secured operation with a session key between the device and the trusted center.

8. The key management method according to claim 2, further comprising:
- requesting, by the device, to the trusted center in the wireless multi-hop network for replacing the ID-based public-private key pair of the device by using a secured operation with a session key between the device and the trusted center, if the ID-based public key of the device is to be replaced;
- building, by the trusted center, a new ID-based public key of the device on reception of the request sent by the device;
- generating, by the trusted center, a new ID-based private key of the device by using the new ID-based public key of the device, to obtain a new ID-based public-private key pair of the device; and
- transmitting, by the trusted center, the new ID-based public-private key pair of the device by using a secured operation with a session key between the device and the trusted center, and adding the original ID-based public key of the device to a public key revocation table.

9. The key management method according to claim 2, further comprising:
- requesting, by the device, to the trusted center of the wireless multi-hop network for revoking the ID-based public key of the device, if the ID-based public key of the device is to be revoked; and
- adding, by the trusted center, the ID-based public key of the device to a public key revocation table, on reception of the request sent by the device.

* * * * *